United States Patent
Tsai

(10) Patent No.: US 11,040,755 B2
(45) Date of Patent: Jun. 22, 2021

(54) BICYCLE HYDRAULIC BRAKE OPERATING DEVICE

(71) Applicant: TIEN HSIN INDUSTRIES CO., LTD., Taichung (TW)

(72) Inventor: Peng-Hsi Tsai, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 231 days.

(21) Appl. No.: 16/124,253

(22) Filed: Sep. 7, 2018

(65) Prior Publication Data

US 2020/0079465 A1    Mar. 12, 2020

(51) Int. Cl.
*B62L 3/02*  (2006.01)

(52) U.S. Cl.
CPC .................... *B62L 3/023* (2013.01)

(58) Field of Classification Search
CPC .... B62L 3/00; B62L 3/02; B62L 3/023; B62L 1/005; B62K 23/06; B62M 25/04; B62M 25/08
See application file for complete search history.

(56) References Cited

U.S. PATENT DOCUMENTS

| | | | | |
|---|---|---|---|---|
| 4,635,442 A * | 1/1987 | Bass | ........................ | B62L 3/023 188/344 |
| 7,204,088 B2 * | 4/2007 | Uchiyama | ............... | B62L 3/023 60/594 |
| 7,516,616 B2 * | 4/2009 | Tetsuka | .................... | B60T 7/102 60/533 |
| 9,469,381 B2 * | 10/2016 | Watarai | .................. | B62K 23/06 |
| 9,751,591 B2 * | 9/2017 | Carrasco Vergara | .... | B62L 3/023 |
| 2014/0060986 A1 * | 3/2014 | Miles | ...................... | B62L 3/023 188/344 |
| 2016/0200392 A1 * | 7/2016 | Bradley | ................ | B60T 17/043 188/344 |
| 2017/0305493 A1 * | 10/2017 | Komada | ................. | B62L 3/023 |
| 2017/0334506 A1 * | 11/2017 | Miki | ..................... | B62K 21/12 |
| 2017/0361897 A1 * | 12/2017 | Miki | ....................... | B62L 3/023 |

FOREIGN PATENT DOCUMENTS

FR    2575991    *  7/1986
TW    M336909        7/2008

* cited by examiner

*Primary Examiner* — Vishal R Sahni
(74) *Attorney, Agent, or Firm* — WPAT, PC

(57) ABSTRACT

A bicycle hydraulic brake lever includes a body, a brake lever, and a linkage member. The linkage member includes a pressing portion and a first actuating portion extending toward different directions, a piston is disposed in a hydraulic cylinder of the body, the piston includes a second actuating portion, the brake lever and the linkage member are both pivotally connected to the body by a pivot, the second actuating portion of the piston comes into contact with a first actuating portion of the linkage member, and a point of force application by the first actuating portion on the second actuating portion is collinear with a center line of the hydraulic cylinder.

10 Claims, 11 Drawing Sheets

BICYCLE HYDRAULIC BRAKE OPERATING DEVICE

BACKGROUND

Technical Field

The present disclosure relates to a hydraulic brake operating device of a bicycle, and in particular, to a brake operating device capable of fully applying, when being wrenched by a hand, a force to a piston, to save labor.

Related Art

A structure of a bicycle hydraulic brake operating device according to the related art, Taiwan Publication No. M336909, as shown in FIG. 1 and FIG. 2, includes a brake body 1, a pressure regulating sleeve 2 being hollow inside and made of rubber, a semi-annular locking piece 3, a hydraulic apparatus 4, and a brake lever 5. The brake body 1 includes an accommodating space 1a and a hydraulic chamber 1b perpendicular to each other, an inclined actuating oil passage 1c and lubricating oil passage 1d are provided between the accommodating space 1a and the hydraulic chamber 1b, an oil inlet hole 1e in communication with the accommodating space 1a is provided on each of two sides of the brake body 1, the oil inlet hole 1e is screwed by an oil inlet bolt 1f, one end of the hydraulic chamber 1b is connected to an oil transfer hole 1g, and the other end of the hydraulic chamber 1b includes a handle pivot base 1h. The accommodating space 1a is sleeved over the pressure regulating sleeve 2, the pressure regulating sleeve 2 includes a positioning surface 2a in a direction away from the hydraulic chamber 1b, a fixing member 2b is attached to the positioning surface 2a and is screwed with the pressure regulating sleeve 2, and the locking piece 3 is screwed with the brake body 1 and seals the pressure regulating sleeve 2 and the fixing member 2b inside. The hydraulic apparatus 4 includes a piston 4a mounted in the hydraulic chamber 1b, front and rear ends of the piston 4a are respectively sheathed with an elastic liquid seal 4b and seal ring 4c and tightly seal the hydraulic chamber 1b, an elastic member 4d, such as a spring, is sleeved over a front part of the piston 4a, and a semi-circular groove is provided on a rear part of the piston 4a. A handle pivot hole 5a and a moving member hole 5b are provided on one end of the brake lever 5, the moving member hole 5b is sleeved over a moving member 5c, the brake lever 5 is pivotally connected to the handle pivot base 1h of the brake body 1 by the handle pivot hole 5a, a fine adjustment hole 5d is provided on a front edge of the handle pivot hole 5a, a fine adjustment member 5e, such as a screw, is mounted on the front edge of the handle pivot hole 5a, one end of a carrier rod 4e is passed through the moving member 5c, and the other end of the carrier rod 4e is semi-circular and matches the semi-circular groove of the piston 4a.

In this way, when a user intends to brake, the user wrenches the brake lever 5 to make the moving member 5c push the carrier rod 4e, and a tail end of the carrier rod 4e further pushes the piston 4a to compress the elastic member 4d, and the normally open actuating oil passage 1c is closed due to displacement of the piston 4a, so that brake oil in an oil tube is squeezed, thereby increasing an oil pressure to produce a braking effect. On the contrary, when the brake lever 5 is released, the oil pressure in the tube and resiliency of the elastic member 4d make the piston 4a retract, so that the hydraulic chamber 1b is in communication with the actuating oil passage 1c, and the oil pressure is exactly released by using an inclined channel of the actuating oil passage 1c.

Because the brake lever 5 is wrenched to push the carrier rod 4e by using the moving member 5c, to enable the carrier rod 4e to push the piston 4a to shift toward the oil transfer hole 1g, a point of force application by the carrier rod 4e on the piston 4a is non-collinear with a center line L of a hydraulic cylinder. When the user wrenches a brake to enable the carrier rod 4e to apply a force to the piston 4a, a component force is definitely generated, a fully effective braking objective cannot be achieved, and the user feels laborious.

SUMMARY

In view of this, a main objective of the present disclosure is to resolve a problem that, in a conventional structure of a bicycle hydraulic brake operating device, an angle formed respect to a force application direction and a center line of a hydraulic piston is not the angle which a force can completely apply to the piston, so that a cyclist needs to apply more forces to push the piston. Further, the present disclosure is developed, and in the present disclosure, when a brake lever is wrenched to drive a brake to rotate, each point of force application by the brake is collinear with a center line of the hydraulic piston, and no component force is generated, so that forces applied by the cyclist to the brake lever of the bicycle are all used for driving the hydraulic piston to shift, thereby achieving the objectives of labor-saving and smooth braking.

To achieve the foregoing objectives, the present disclosure provides a bicycle hydraulic brake operating device, comprising: a brake lever, a body, a linkage member, and a pivot. The brake lever comprises a pivot end; the body comprises a liquid reservoir, a hydraulic cylinder, and a piston, where the piston is movably disposed in the hydraulic cylinder; the linkage member comprises a pressing portion and a first actuating portion extending toward different directions, where the linkage member is disposed between the brake lever and the piston, and respectively actuates the piston and the brake lever by the first actuating portion and the pressing portion, the piston comprises a second actuating portion and comes into contact with the first actuating portion by the second actuating portion, and when the piston is respectively located at a first position and a second position inside the hydraulic cylinder, points of forces application by the first actuating portion on the second actuating portion are both collinear with a center line of the hydraulic cylinder; and the pivot is passed through the body, the linkage member and the pivot end, and makes the linkage member and the brake lever both pivotally connected to the body.

An opening of the liquid reservoir facing toward the brake lever is closed by a bolt, the liquid reservoir stores liquid, the liquid reservoir is in communication with the hydraulic cylinder by a first liquid passage, and the linkage member presses against the bolt of the liquid reservoir by the pressing portion.

An assembly space in communication with the hydraulic cylinder is provided at a position close to the brake lever relative to the hydraulic cylinder, a diameter of the assembly space is greater than a diameter of the hydraulic cylinder, so that an annular wall is formed between the assembly space and the hydraulic cylinder, the assembly space is sleeved over a sleeve, an inner diameter of the sleeve is the same as an inner diameter of the hydraulic cylinder, the piston is inserted into the sleeve and the hydraulic cylinder, and moves in the sleeve and the hydraulic cylinder, an annular groove is formed between the sleeve and the annular wall, the liquid in the liquid reservoir enters the annular groove through a second liquid passage, and a biasing member is disposed between the hydraulic cylinder and the piston to provide a return force for the piston to move and shift back and forth.

The body comprises a pair of protruding portions extending toward the brake lever, each protruding portion comprises a first hole, the sleeve comprises a pair of extension portions protruding out of the body, each extension portion comprises a bushing extending toward the protruding portion, the extension portion comprises a second hole running through two ends of the bushing, the linkage member comprises a third hole, the pivot end of the brake lever comprises a connection portion connecting two side walls, each side wall comprises a pivot hole, the pivot is passed through the second hole of one of the bushings and the pivot hole of one of the side walls of the brake lever, and the pivot is passed through the third hole of the linkage member and is passed through the pivot hole of the other side wall of the brake lever and the second hole of the other bushing.

The connection portion connects the two side walls to form a mounting space inside, the connection portion comprises a fourth hole, the linkage member, a positioning base and a positioning rod are disposed inside the mounting space, the positioning base comprises a concave portion, a limiting groove and a screw hole, the concave portion matches an outer wall of the positioning rod, the positioning rod comprises a positioning hole, the fourth hole is provided for an adjustment member to pass through and to be screwed with the screw hole of the positioning base, a tail end of the adjustment member presses against the linkage member, an elastic element is disposed in the limiting groove, one end of the elastic element presses against the pressing portion of the linkage member, and the other end of the elastic element presses against an inner wall of the limiting groove.

The pressing portion comprises a first pressing surface and a second pressing surface, a third pressing surface is provided between the pressing portion and the first actuating portion, one end of the elastic element presses against the second pressing surface, the tail end of the adjustment member presses against the third pressing surface of the linkage member, and the pressing portion presses against the bolt by using the first pressing surface.

A surface of the first actuating portion of the linkage member facing toward the piston is a first actuating surface, the second actuating portion of the piston comprises a connecting member, an outer periphery of the connecting member is a second actuating surface, and when the piston are respectively located at the first position and the second position inside the hydraulic cylinder, the points of forces application where the first actuating surface contacts with the second actuating surface are both collinear with the center line of the hydraulic cylinder.

The first actuating surface of the linkage member comprises a plurality of curvature radii, and the curvature radii are different.

The curvature radii are in a range of 1 mm to 50 mm.

A quantity of the curvature radii is greater than or equal to three.

In this way, when the brake lever is wrenched, the linkage member is pressed downward by the adjustment member, so that when the linkage member rotates around the pivot, the arc-shaped first actuating surface of the first actuating portion changes the points of application of the forces by the first actuating surface on the second actuating surface of the piston, and each point of force application on the arc-shaped first actuating surface is collinear with a center line of the piston, so that no component force is generated, and when a cyclist is braking, wrenching forces for a hand to grip the brake lever are all applied to displacement of the piston, thereby saving labor.

DETAILED DESCRIPTION

Figure 1:
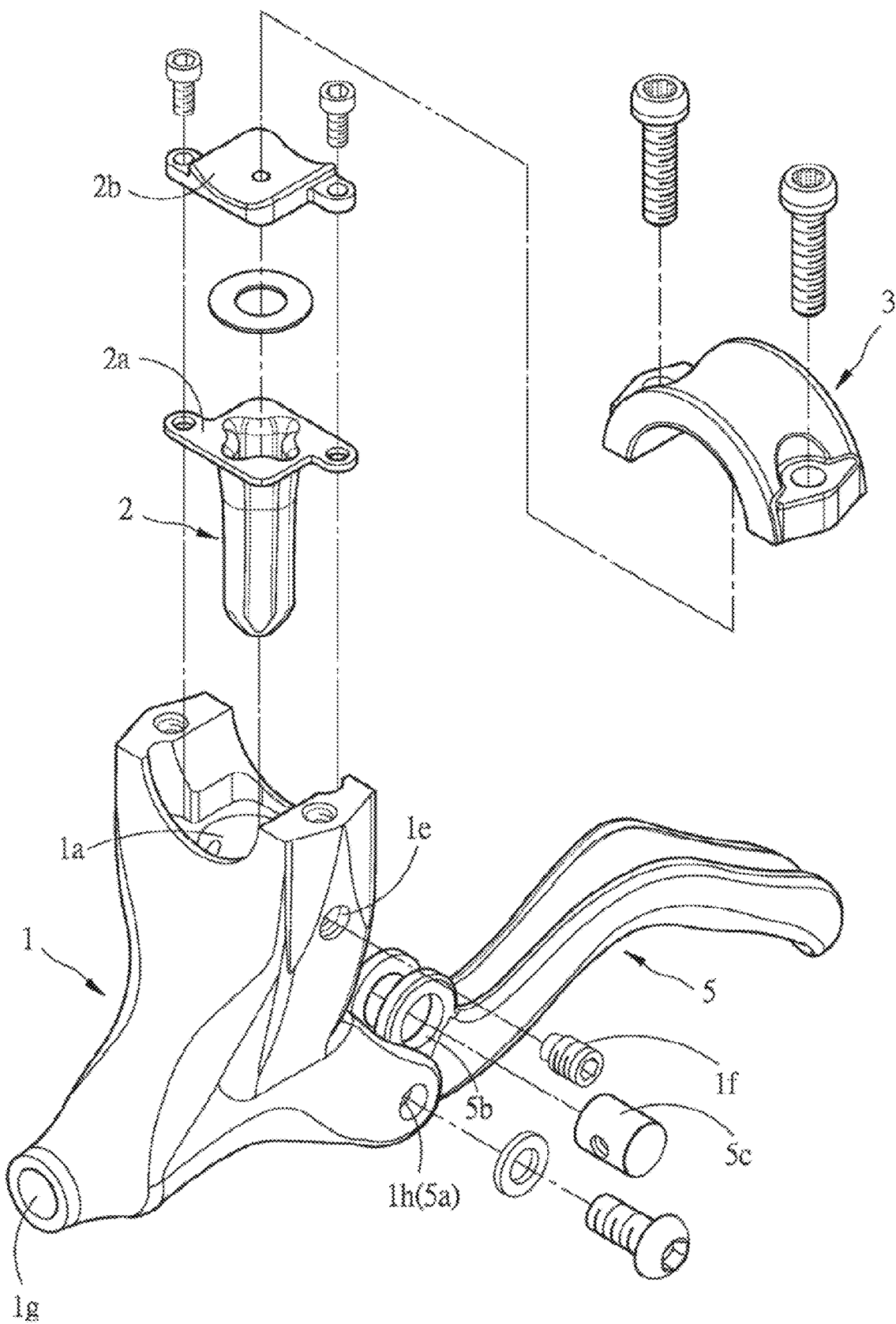
FIG. 1 is a three-dimensional diagram of a structure of a bicycle hydraulic brake operating device according to Taiwan Publication No. M336909.

Details and technical descriptions related to the present disclosure are further described by using embodiments. However, it should be understood that the embodiments are used for only illustration and should not be explained as a limit to implementation of the present disclosure.

Referring to FIG. 3, FIG. 4, FIG. 5A, and FIG. 5B, a bicycle hydraulic brake operating device in the present disclosure includes a body 10, a sleeve 20, a linkage member 30, a positioning base 40, a brake lever 50, and a piston 60. The body 10 is coated by a first housing 100 and a second housing 200 combined in a fitting manner. The body 10 includes a liquid reservoir 11 and a hydraulic cylinder 12. The liquid reservoir 11 stores liquid such as brake oil. An opening of the liquid reservoir 11 faces toward the brake lever 50. The opening of the liquid reservoir 11 is tightened and screwed by using a bolt 13 to close the opening, and the hydraulic cylinder 12 and the liquid reservoir 11 are disposed in a same direction. A first liquid passage 14 and a second liquid passage 15 are provided between the liquid reservoir 11 and the hydraulic cylinder 12. An assembly space 16 in communication with the hydraulic cylinder 12 is provided at a position close to the brake lever 50 relative to the hydraulic cylinder 12. A diameter of the assembly space 16 is greater than a diameter of the hydraulic cylinder 12, so that an annular wall 17 is formed between the assembly space 16 and the hydraulic cylinder 12. The body 10 includes a pair of protruding portions 18 extending toward the brake lever 50. Each protruding portion 18 includes a first hole 181.

The assembly space 16 is sleeved over the sleeve 20. The piston 60 is inserted into the sleeve 20 and the hydraulic cylinder 12, so that the piston 60 can move back and forth in the sleeve 20 and the hydraulic cylinder 12. An annular groove 161 is formed between the sleeve 20 and the annular wall 17. The liquid in the liquid reservoir 11 may enter the annular groove 161 through the second liquid passage 15 to lubricate the piston 60 when the piston 60 moving back and forth.

The sleeve 20 includes a pair of extension portions 21 extending toward the brake lever 50. The pair of extension portions 21 protrudes out of the body 10 and is sandwiched between the two protruding portions 18. A bushing 22 extending toward the protruding portion 18, and the busing 22 is provided on an outer side surface of each extension portion 21. The extension portion 21 includes a second hole 221 running through two ends of the bushing 22. The bushing 22 is inserted into the first hole 181 of the protruding portion 18 of the body 10.

Figure 6A:
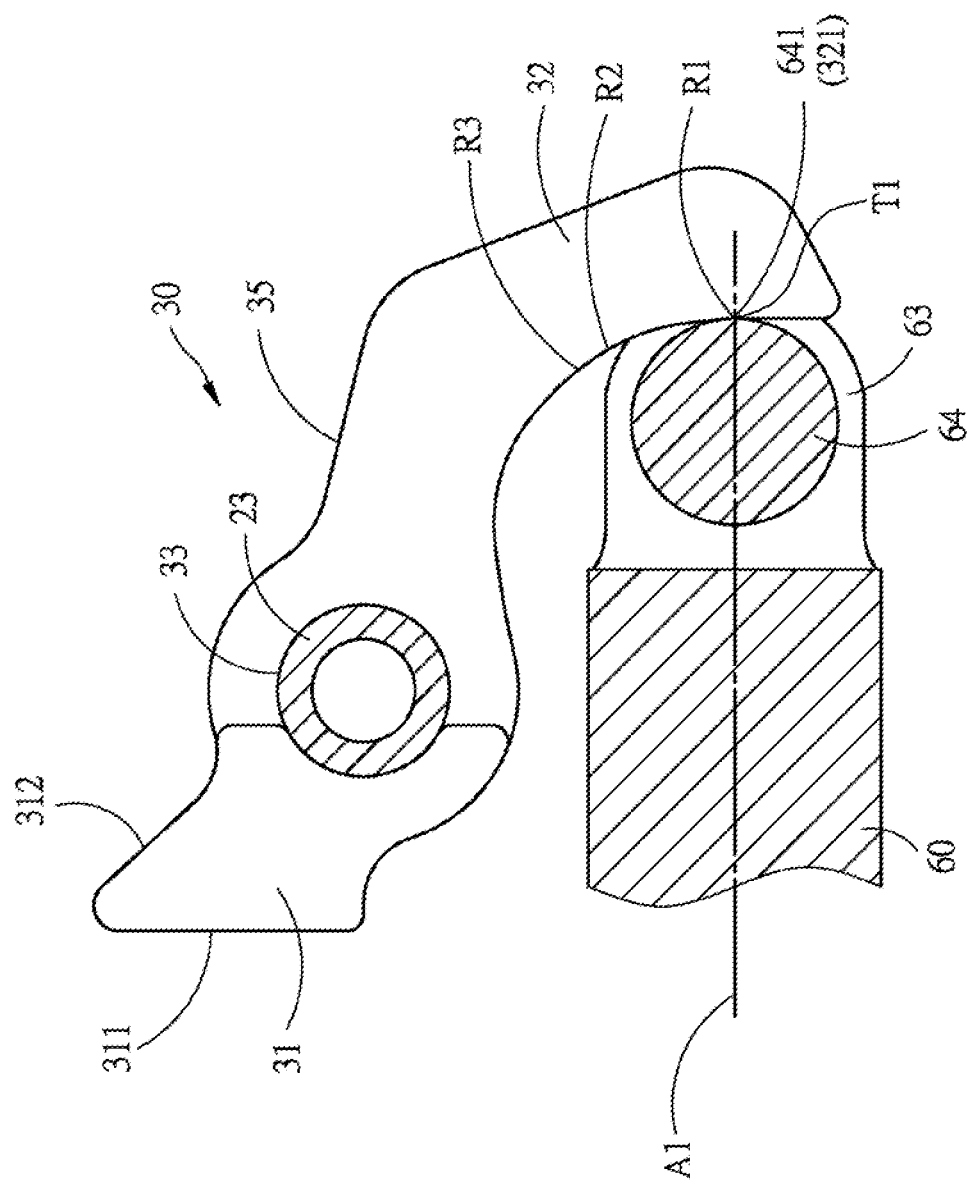
FIG. 6A to FIG. 6C are schematic diagrams of actions when a first actuating surface of a linkage member comes into contact with a second actuating surface of a piston according to the present disclosure.
Figure 6B:
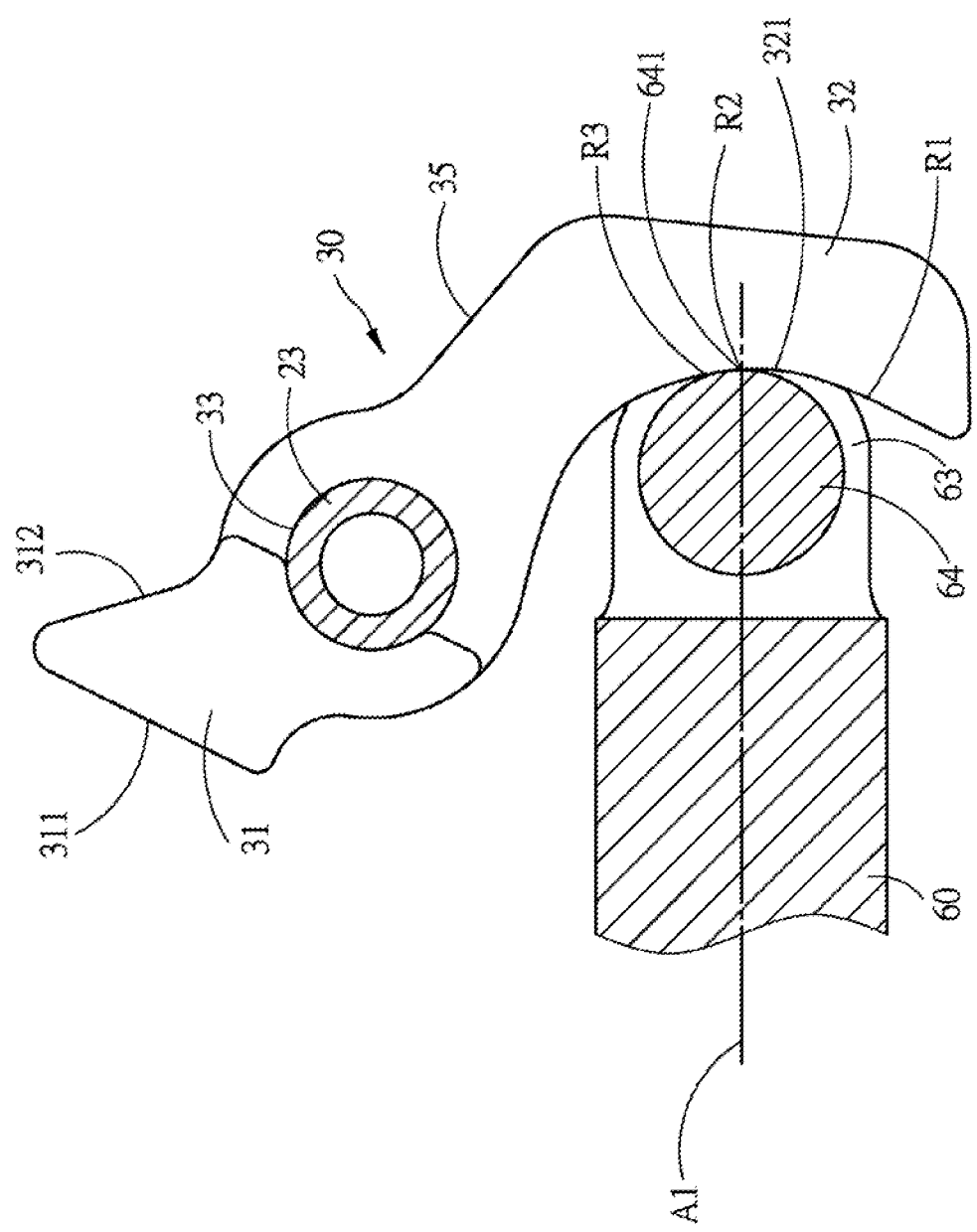
Figure 6C:
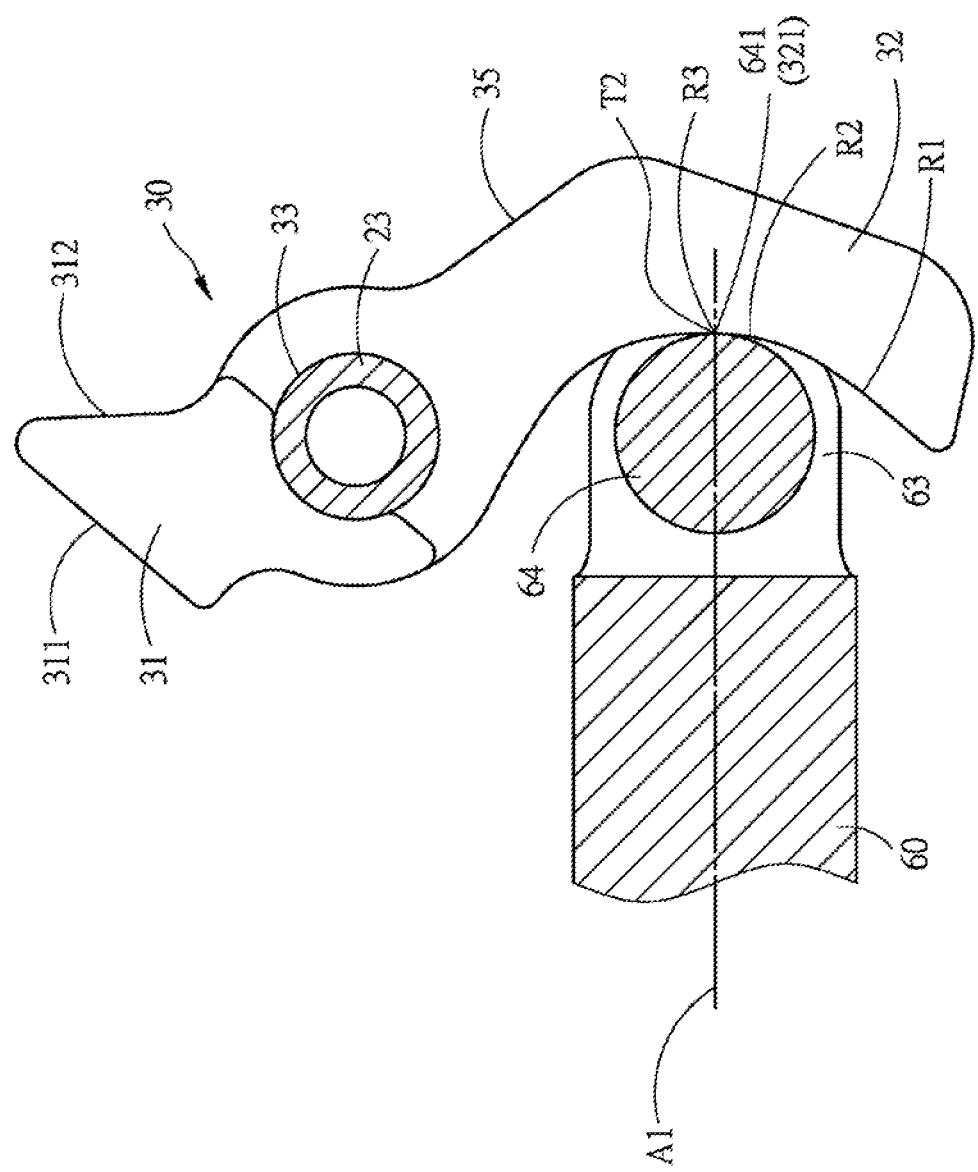

The linkage member 30 includes a pressing portion 31 and a hook-like first actuating portion 32 extending toward different directions. The linkage member 30 is disposed between the brake lever 50 and the piston 60. The pressing portion 31 presses against the body 10. A third hole 33 is provided between the pressing portion 31 and the first actuating portion 32. An inner diameter of the sleeve 20 is the same as an inner diameter of the hydraulic cylinder 12. The pressing portion 31 includes a first pressing surface 311 pressing against a radial surface on an outer side of the bolt 13. The pressing portion 31 includes a second pressing surface 312 opposite to the first pressing surface 311. A first actuating surface 321 in a concave arc shape is provided on the first actuating portion 32 facing toward the piston 60. The first actuating surface 321 includes at least two curvature radii R1 and R2. Lengths of the two curvature radii R1 and R2 are different. The two curvature radii R1 and R2 are in a range of 1 mm to 50 mm. In this embodiment, the first actuating surface 321 includes at least three curvature radii R1, R2 and R3. Further, referring to FIG. 6A to FIG. 6C, the three curvature radii R1, R2 and R3 are in a range of 1 mm to 50 mm. A third pressing surface 35 is provided between the pressing portion 31 and the first actuating portion 32.

The positioning base 40 includes an adjustment member 41, a concave portion 42, a limiting groove 43, a positioning rod 44 and a screw hole 45. The positioning rod 44 is passed through a positioning hole 47 in a radial direction. In this embodiment, the adjustment member 41 is a screw. The adjustment member 41 is passed through the brake lever 50 and is screwed with the screw hole 45, and the adjustment member 41 is passed through the positioning hole 47 of the positioning rod 44 to press against the third pressing surface 35 of the linkage member 30. The concave portion 42 matches an outer wall of the positioning rod 44. An elastic element 46 retractable in an axial direction, for example, a spring, is disposed in the limiting groove 43. One end of the elastic element 46 presses against the second pressing surface 312 of the linkage member 30, the other end of the elastic element 46 presses against an inner wall of the limiting groove 43, so that the first pressing surface 311 of the pressing portion 31 presses against the bolt 13 under the action of an elastic force of the elastic element 46.

The brake lever 50 is provided for a cyclist to grip to brake. The brake lever 50 includes a pivot end 51 pivotally connected to the body 10. The pivot end 51 includes a pair of side walls 52 opposite to each other and an arc-shaped connection portion 53 connecting the pair of side walls 52, so that a mounting space 55 is formed inside the pivot end 51. The linkage member 30, the positioning base 40 and the positioning rod 44 are disposed in the mounting space 55, and an initial position of the linkage member 30 is adjusted by adjusting a distance between the connection portion 53 and the adjustment member 41. In addition, the connection portion 53 includes a fourth hole 54 in communication with the mounting space 55. The adjustment member 41 is passed through the fourth hole 54 and further, is screwed with the screw hole 45 of the positioning base 40. The adjustment member 41 is also passed through the positioning hole 47 of the positioning rod 44, and a tail end of the adjustment member 41 presses against the third pressing surface 35 of the linkage member 30. Each side wall 52 includes a fifth hole 56 and a pivot hole 57. The positioning rod 44 is passed through the fifth holes 56 of the two side walls 52. The two side walls 52 are disposed between the two extension portions 21 of the sleeve 20, the two extension portions 21 are disposed between the two protruding portions 18 of the body 10, and the bushing 22 of the extension portion 21 is inserted into the first hole 181 of the protruding portion 18 of the body 10.

A pivot 23 is passed through the second hole 221 of one of the bushings 22, is passed through the pivot hole 57 of one of the side walls 52 of the brake lever 50, and then, after being passed through the third hole 33 of the linkage member 30, the pivot 23 is passed through the pivot hole 57 of an other side wall 52 and the second hole 221 of an other bushing 22, so that the sleeve 20, the linkage member 30 and the brake lever 50 are pivotally connected to the body 10.

The piston 60 is inserted into the sleeve 20 and the hydraulic cylinder 12, and moves in the hydraulic cylinder 12 along a center line A1 of the hydraulic cylinder. A concave neck 61 is provided on an end, distal to the brake lever 50, of the piston 60. The concave neck 61 is sheathed with an elastic ring 62. A biasing member 65 is disposed between the hydraulic cylinder 12 and the end, distal to the brake lever 50, of the piston 60, to provide a return force required by the piston 60 when the piston 60 moves in the hydraulic cylinder 12. A diameter of a rear end, distal to the brake lever 50, of the piston 60 is less than a diameter of a body of the piston 60, and the rear end is located in the hydraulic cylinder 12. A U-shaped second actuating portion 63 is provided on an other end of the piston 60 facing toward the brake lever 50. The second actuating portion 63 is pivotally connected to a circular rod-shaped connecting member 64. An axial direction of the connecting member 64 is perpendicular to an axial direction of the piston 60. An outer periphery of the connecting member 64 is a second actuating surface 641. The first actuating portion 32 presses against the second actuating surface 641 by using the first actuating surface 321, so that the piston 60 moves backward. In addition, a point T1 of application of a force where the first actuating surface 321 comes into contact with the second actuating surface 641 is collinear with the center line A1 of the hydraulic cylinder, so that no component force is generated when the linkage member 30 applies a force to the piston 60, and the piston 60 can shift in the hydraulic cylinder 12 along the center line A1 of the hydraulic cylinder.

Figure 4:
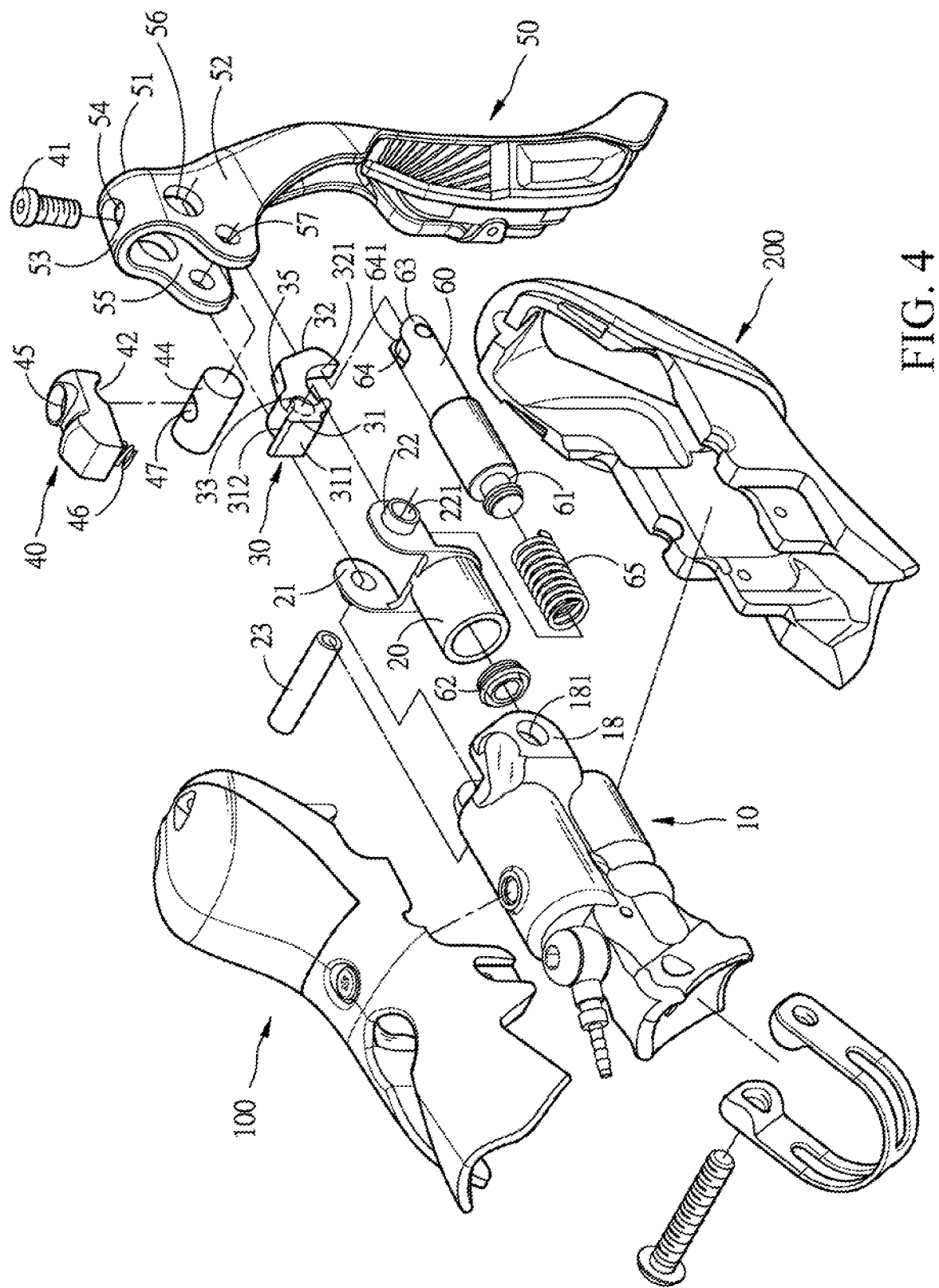
FIG. 4 is a three-dimensional exploded view 2 according to an embodiment of the present disclosure.
Figure 5A:
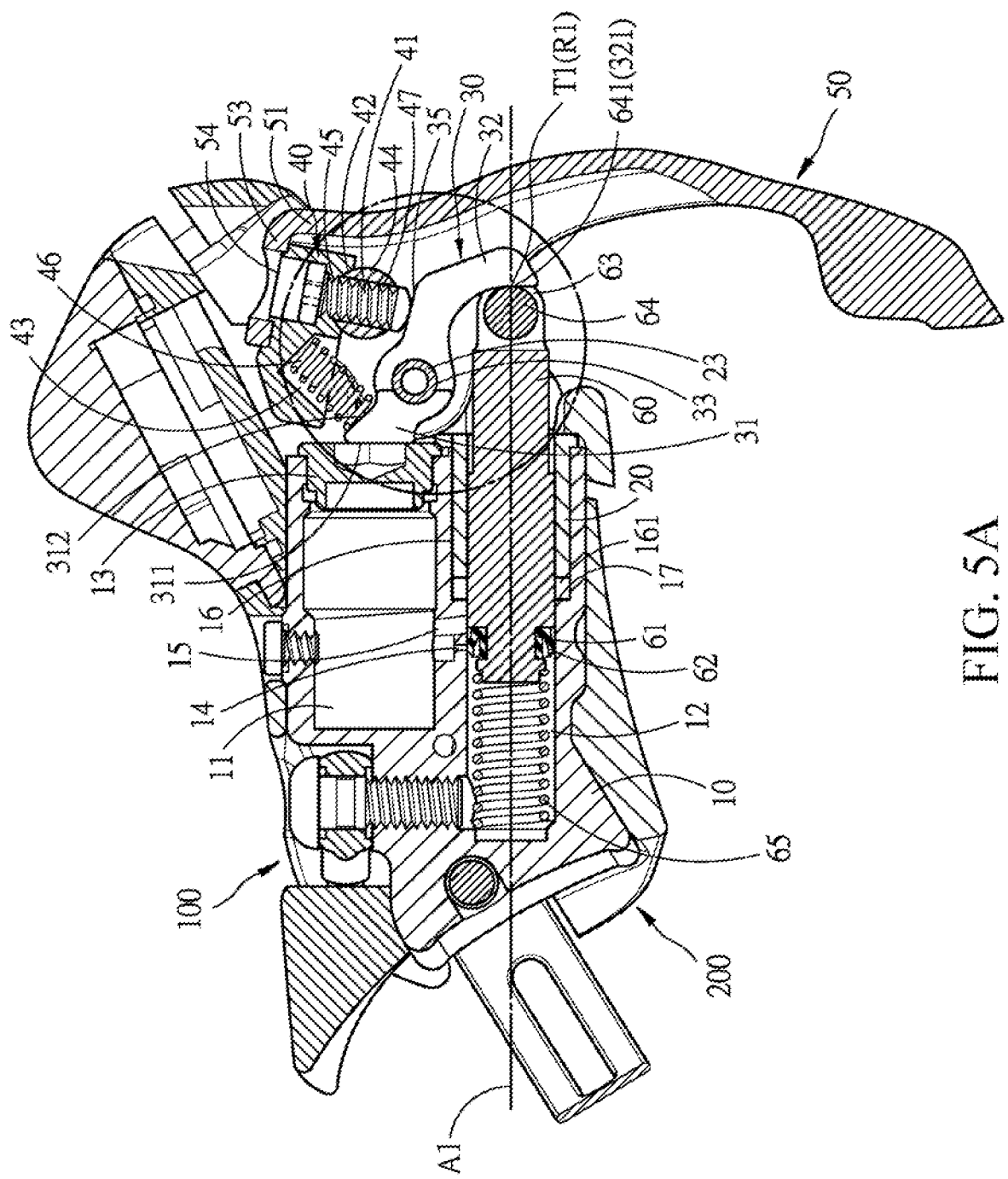
FIG. 5A is a combined sectional view (in a not-braking state) according to an embodiment of the present disclosure.
Figure 5B:
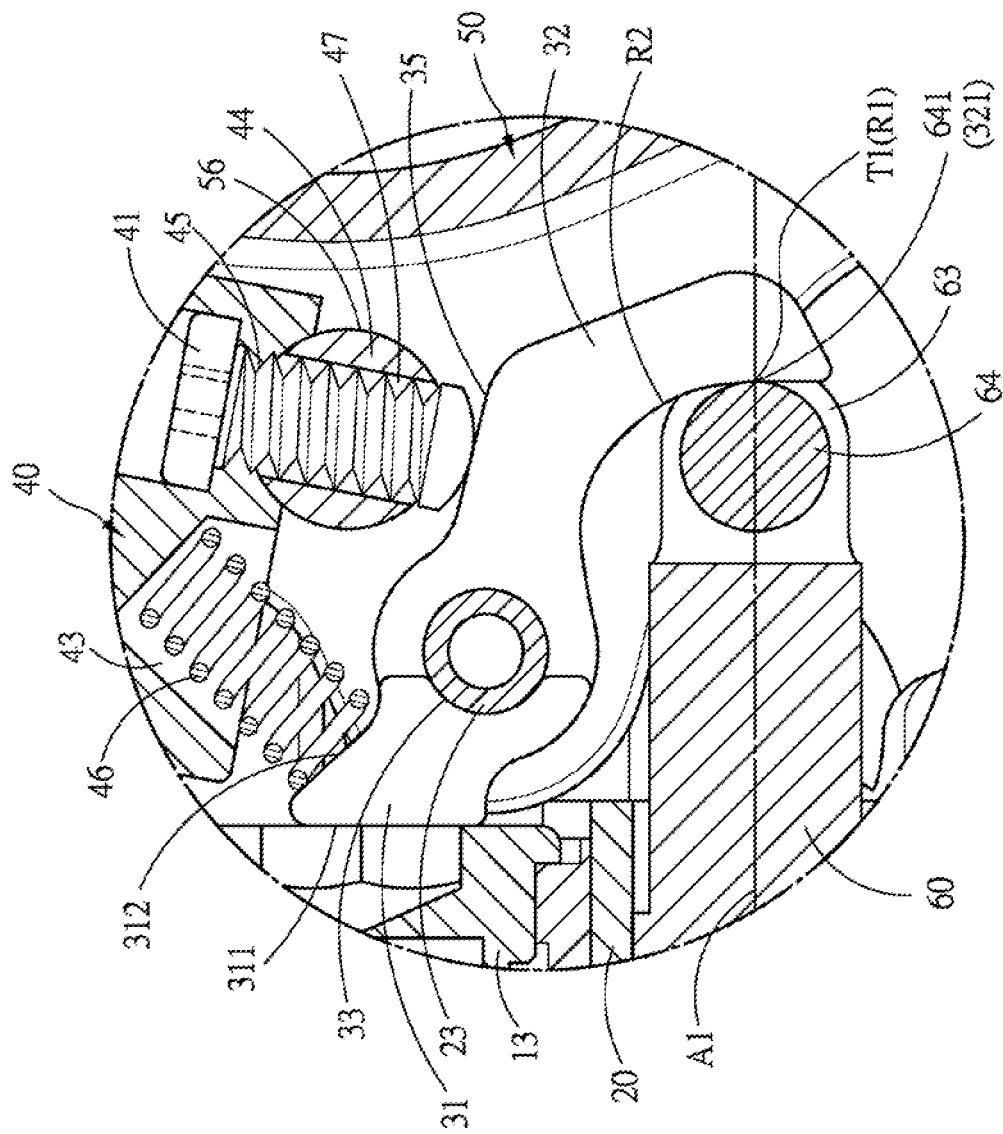
FIG. 5B is a partially enlarged view of FIG. 5A.

During assembly, referring to FIG. 4 and FIG. 5A together, first, the sleeve 20 is sheathed with the assembly space 16, and the piston 60 is passed through the sleeve 20 and is disposed in the hydraulic cylinder 12 along the center line A1 of the hydraulic cylinder. The bushing 22 of the sleeve 20 is inserted into the first hole 181 of the protruding portion 18 of the body 10. The pivot 23 is first passed through the second hole 221 of one of the bushings 22 and the pivot hole 57 of one of the side walls 52 of the brake lever 50, is passed through the third hole 33 of the linkage member 30, and then, is passed through the pivot hole 57 of the other side wall 52 of the brake lever 50 and the second hole 221 of the other bushing 22, so that the sleeve 20, the linkage member 30 and the brake lever 50 are pivotally connected to the body 10 together.

Subsequently, the positioning base 40 is disposed in the mounting space 55 of the brake lever 50, and the positioning rod 44 is passed through one of the fifth holes 56 of the two side walls 52 of the brake lever 50 through the fifth hole 56 of the other side wall 52, so that two ends of the positioning rod 44 are respectively nested by the fifth holes 56 of the two side walls 52.

In addition, the one end of the elastic element 46 presses against the second pressing surface 312 of the linkage member 30, and the other end of the elastic element 46 presses against the inner wall of the limiting groove 43, so that the adjustment member 41 is passed through the fourth hole 54 of the brake lever 50 and is screwed with the screw hole 45 of the positioning base 40, and is passed through the positioning hole 47 of the positioning rod 44, and the tail end of the adjustment member 41 presses against the third pressing surface 35 of the linkage member 30.

In this assembling structure, the first actuating surface 321 of the linkage member 30 presses against the second actuating surface 641 of the piston 60, and the point T1 of application of the force by the first actuating surface 321 on the second actuating surface 641 is collinear with the center line A1 of the hydraulic cylinder.

Figure 7A:
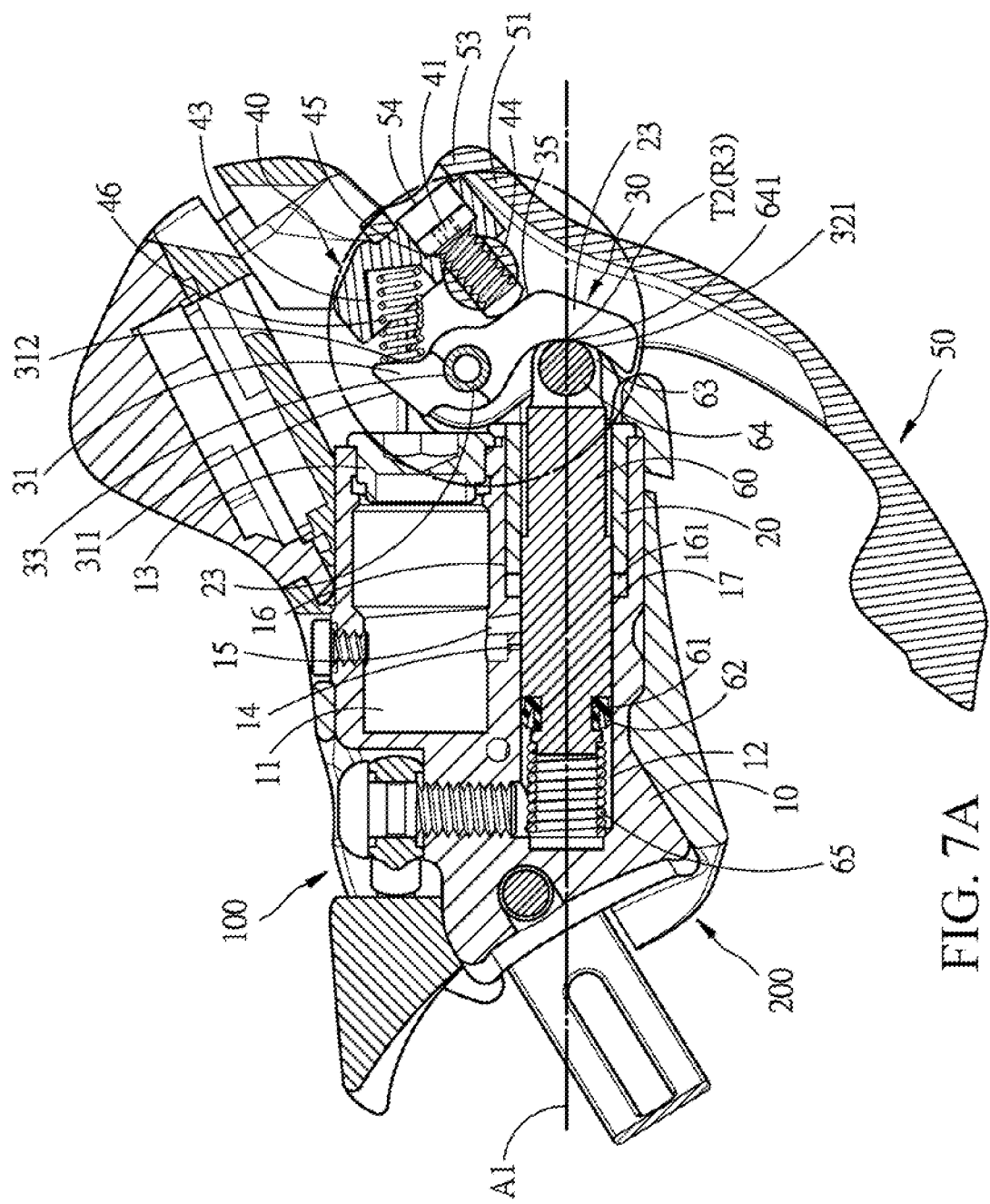
FIG. 7A is an action diagram (in a braking state) according to an embodiment of the present disclosure.
Figure 7B:
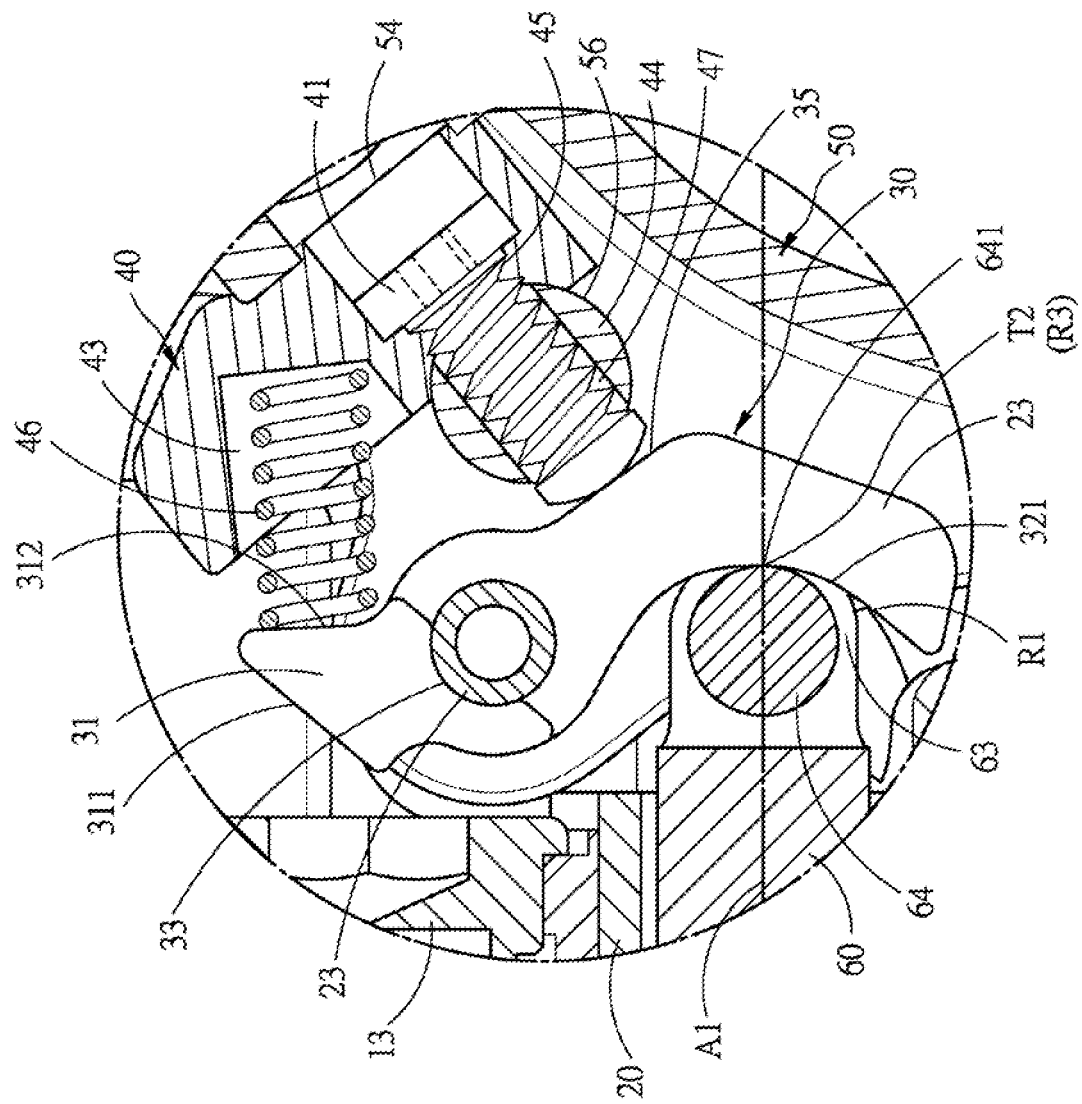
FIG. 7B is a partially enlarged view of FIG. 7A.

Referring to FIG. 7A and FIG. 7B, when the cyclist intends to brake, the cyclist wrenches the brake lever 50, to drive the adjustment member 41 of the positioning base 40 to press against the third pressing surface 35 of the linkage member 30 to rotate the linkage member 30 and push the second actuating surface 641 by using the first actuating surface 321 of the linkage member 30. A point T2 of application of a force where the first actuating surface 321 comes into contact with the second actuating surface 641 of the connecting member 64 is collinear with the center line A1 of the hydraulic cylinder 12, so that no component force is generated when the linkage member 30 applies a force to the piston 60, the piston 60 shifts in the hydraulic cylinder 12 along the center line A1 of the hydraulic cylinder 12, further, the first liquid passage 14 is closed by using the piston 60, and liquid in the hydraulic cylinder 12 is squeezed, thereby increasing a pressure to produce a braking effect.

Figure 2:
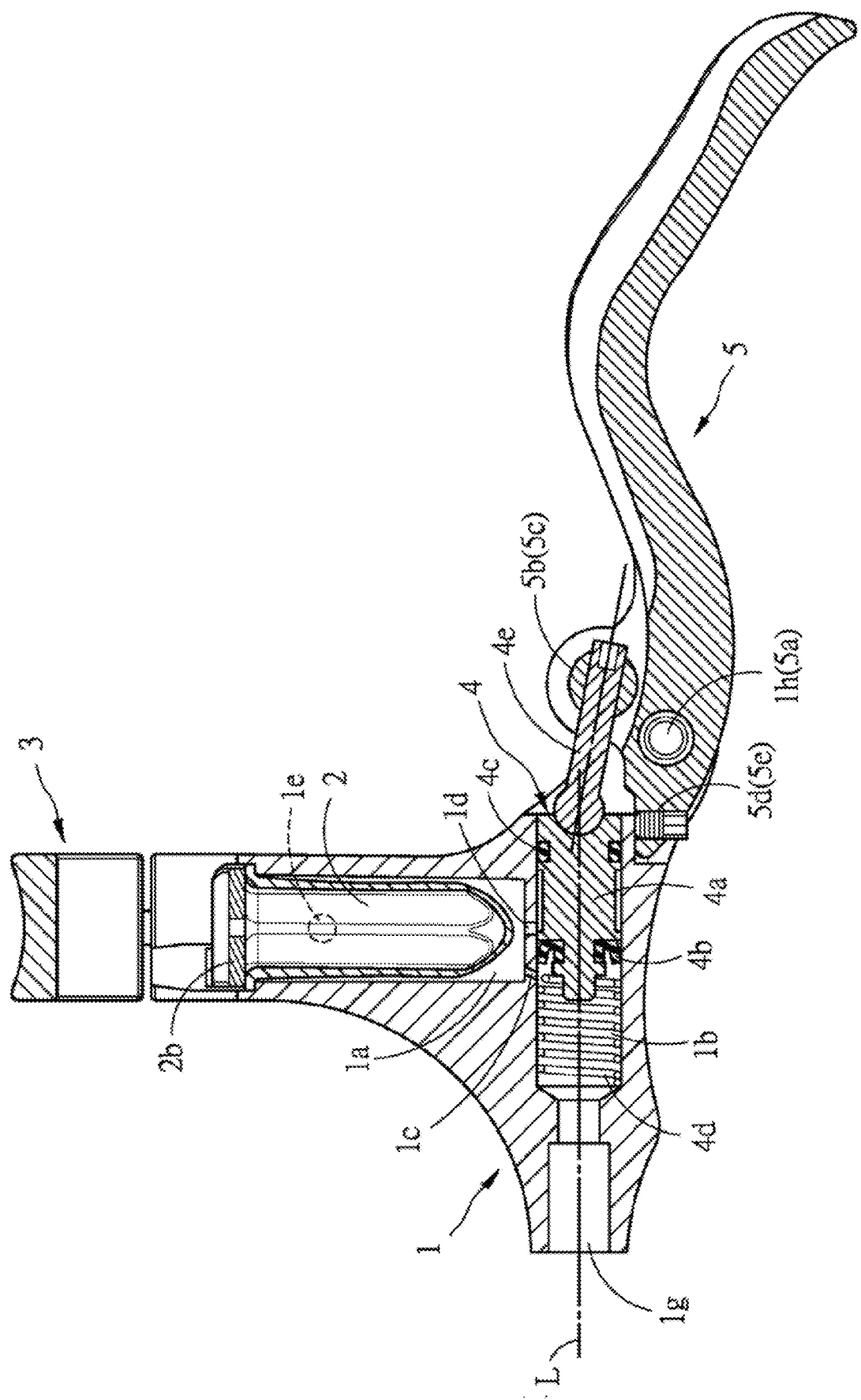
FIG. 2 is a sectional view of a structure of a bicycle hydraulic brake operating device according to Taiwan Publication No. M336909.
Figure 3:
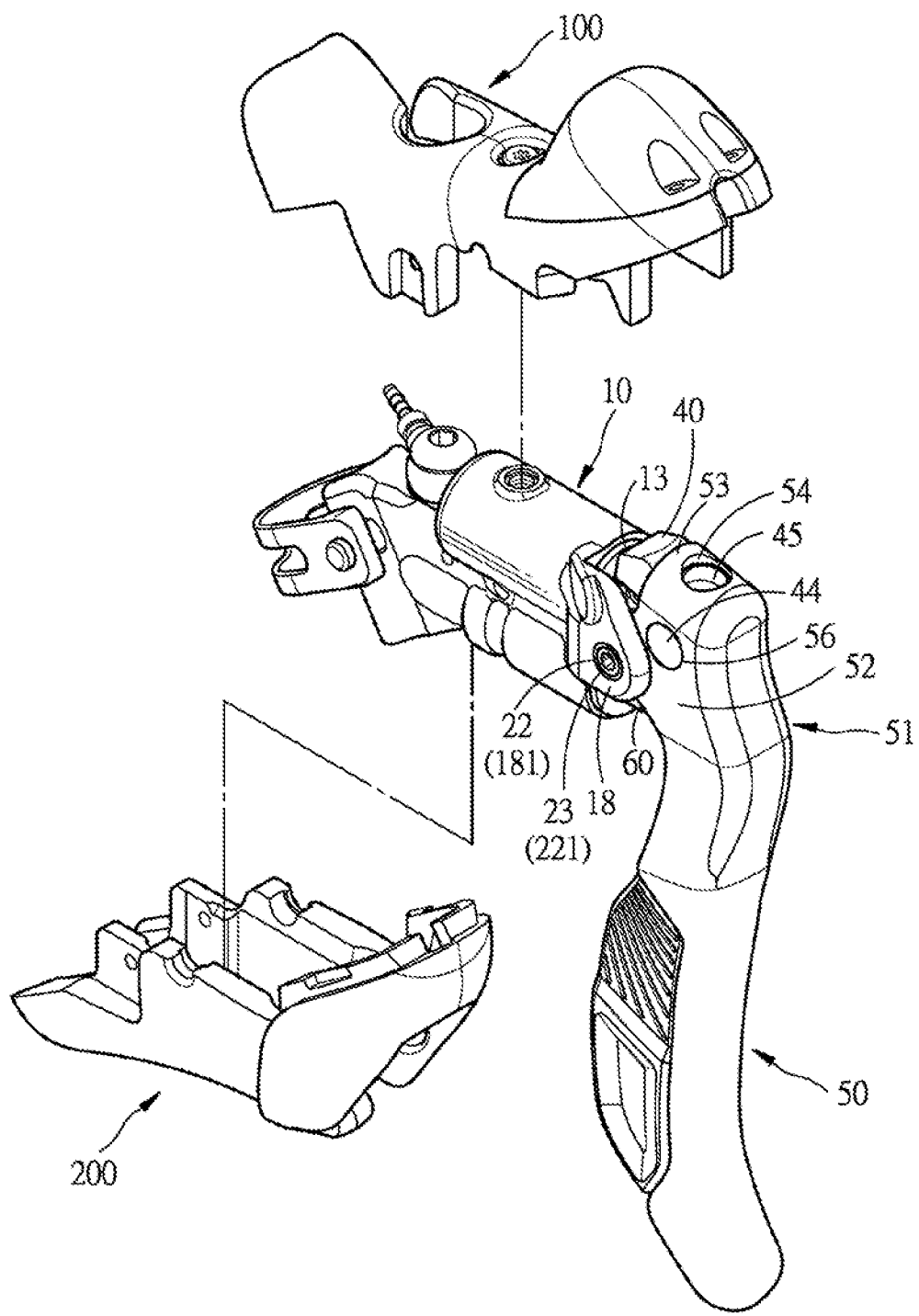
FIG. 3 is a three-dimensional exploded view 1 according to an embodiment of the present disclosure.

It should be noted that the point T1 of application of the force by the first actuating surface 321 of the linkage member 30 on the second actuating surface 641 of the piston 60 in the present disclosure is collinear with the center line A1 of the hydraulic cylinder 12. When the brake lever 50 is wrenched, the linkage member 30 is subject to a force applied by the adjustment member 41 and rotates around the pivot 23. A point of force application by the first actuating surface 321 of the first actuating portion 32 on the second actuating surface 641 of the connecting member 64 moves from T1 to T2, as shown in FIG. 5A, FIG. 5B, FIG. 7A, and FIG. 7B. In addition, the points of application of the forces T1 and T2 are both collinear with the center line A1 of the hydraulic cylinder 12, so that a pushing force by which the linkage member 30 presses against the piston 60 is collinear with the center line A1 of the hydraulic cylinder 12, no component force is generated when the piston 60 shifts to the hydraulic cylinder 12 along the center line A1 of the hydraulic cylinder 12, when the cyclist is braking, wrenching forces for a hand to grip the brake lever 50 are fully applied, to drive the piston to shift, to close the first liquid passage 14, thereby increasing a pressure in the hydraulic cylinder 12 to produce the braking effect. This is indeed more labor-saving than a conventional structure of a bicycle hydraulic brake operating device in FIG. 1 and FIG. 2.

On the contrary, when the cyclist releases the brake lever 50, resiliency and return tension of the liquid in the hydraulic cylinder 12 and the biasing member 65 enable the piston 60 to retract to an original position, so that the first liquid passage 14 is in communication with the hydraulic cylinder 12. The first actuating portion 32 of the linkage member 30 is pushed backward by the second actuating surface 641 to return to an original position, so that because of the return of a brake member 30, the adjustment member 41 is pushed backward to drive the brake lever 50 to return to a state in FIG. 5A.

In this way, during braking, the points of application of the forces T1 and T2 where the first actuating surface 321 of the linkage member 30 comes into contact with the second actuating surface 641 of the piston 60 are changed to make both the points of application of the forces T1 and T2 collinear with the center line A1 of the hydraulic cylinder 12, so that no resultant force is generated, and wrenching forces for a hand of the cyclist to grip the brake lever 50 are fully applied to the piston 60, thereby saving labor.

The foregoing descriptions are merely preferred embodiments of the present disclosure, and are not used to limit the implementation scope of the present disclosure. That is, any simple equivalent variations or modifications made according to claims of the present disclosure and description content of the present disclosure shall fall within the scope of the present disclosure patent.

What is claimed is:

1. A bicycle hydraulic brake operating device, comprising:
    a brake lever, comprising a pivot end;
    a body, comprising a liquid reservoir, a hydraulic cylinder, and a piston, the piston is movably disposed in the hydraulic cylinder;
    a linkage member, comprising a pressing portion and a first actuating portion extending toward different directions, wherein the linkage member is disposed between the brake lever and the piston, and respectively actuates the piston and the brake lever by the first actuating portion and the pressing portion, the piston comprises a second actuating portion and contacts with the first actuating portion by the second actuating portion, and when the piston is respectively located at a first position and a second position inside the hydraulic cylinder, points of forces application by the first actuating portion on the second actuating portion are both collinear with a center line of the hydraulic cylinder, and no component force is generated when a pushing force by which the first actuating portion of the linkage member presses against the second actuating portion of the piston is relative to the center line of the hydraulic cylinder; and
    a pivot, passed through the body, the linkage member and the pivot end, and making the linkage member and the brake lever both pivotally connected to the body;
    wherein no component force is generated during an entire range of motion of the first actuating portion.

2. The bicycle hydraulic brake operating device according to claim 1, wherein an opening of the liquid reservoir facing toward the brake lever is closed by a bolt, the liquid reservoir is in communication with the hydraulic cylinder by a first liquid passage, and the linkage member presses against the bolt of the liquid reservoir by the pressing portion.

3. The bicycle hydraulic brake operating device according to claim 2, wherein an assembly space in communication with the hydraulic cylinder is provided at a position approaches to the brake lever relative to the hydraulic cylinder, a diameter of the assembly space is larger than a diameter of the hydraulic cylinder, so that an annular wall is formed between the assembly space and the hydraulic cylinder; a sleeve disposed in the assembly space, an inner diameter of the sleeve is the same as an inner diameter of the hydraulic cylinder, the piston is inserted into the sleeve and the hydraulic cylinder, and moves in the sleeve and the hydraulic cylinder; an annular groove is formed between the sleeve and the annular wall; the liquid in the liquid reservoir enters the annular groove through a second liquid passage; and an biasing member is disposed between the hydraulic cylinder and the piston.

4. The bicycle hydraulic brake operating device according to claim 3, wherein the body comprises a pair of protruding portions extending toward the brake lever, each protruding portion comprises a first hole; the sleeve comprises a pair of extension portions protruding out of the body, each extension portion comprises a bushing extending toward the protruding portion; the extension portion comprises a second hole running through two ends of the bushing, the linkage member comprises a third hole; the pivot end of the brake lever comprises a connection portion connecting two side walls, each side wall comprises a pivot hole, the pivot is passed through the second hole of one of the bushings and the pivot hole of one of the side walls of the brake lever, and the pivot is passed through the third hole of the linkage member and is passed through the pivot hole of the other side wall of the brake lever and the second hole of the other bushing.

5. The bicycle hydraulic brake operating device according to claim 4, wherein the connection portion connects the two side walls to form a mounting space inside, the connection portion comprises a fourth hole; the linkage member, a positioning base and a positioning rod are disposed inside the mounting space; the positioning base comprises a concave portion, a limiting groove and a screw hole, the concave portion matches an outer wall of the positioning rod; the positioning rod comprises a positioning hole, the fourth hole is provided for an adjustment member to pass through and to be screwed with the screw hole of the positioning base, a tail end of the adjustment member presses against the linkage member; an elastic element is disposed in the limiting groove, one end of the elastic element presses against the pressing portion of the linkage member, and the other end of the elastic element presses against an inner wall of the limiting groove.

6. The bicycle hydraulic brake operating device according to claim 5, wherein the pressing portion comprises a first pressing surface and a second pressing surface, a third pressing surface is provided between the pressing portion and the first actuating portion; one end of the elastic element presses against the second pressing surface; the tail end of the adjustment member presses against the third pressing surface of the linkage member, and the pressing portion presses against the bolt by using the first pressing surface.

7. The bicycle hydraulic brake operating device according to claim 1, wherein a first actuating surface is a surface of the first actuating portion of the linkage member facing toward the piston; the second actuating portion of the piston comprises a connecting member, an outer periphery of the connecting member is a second actuating surface, and when the piston is respectively located at the first position and the second position inside the hydraulic cylinder; wherein the points of forces application where the first actuating surface comes into contact with the second actuating surface are both collinear with the center line of the hydraulic cylinder.

8. The bicycle hydraulic brake operating device according to claim 7, wherein the first actuating surface of the linkage member comprises a plurality of curvature radii, and the curvature radii are different.

9. The bicycle hydraulic brake operating device according to claim 8, wherein the curvature radii are no less than 1 mm and no greater than 50 mm.

10. The bicycle hydraulic brake operating device according to claim 8, wherein a quantity of the curvature radii is greater than or equal to three.

* * * * *